Aug. 25, 1925.
J. F. PRIBNOW
1,551,054
SAW GRINDING MACHINE
Filed June 15, 1923  4 Sheets-Sheet 1
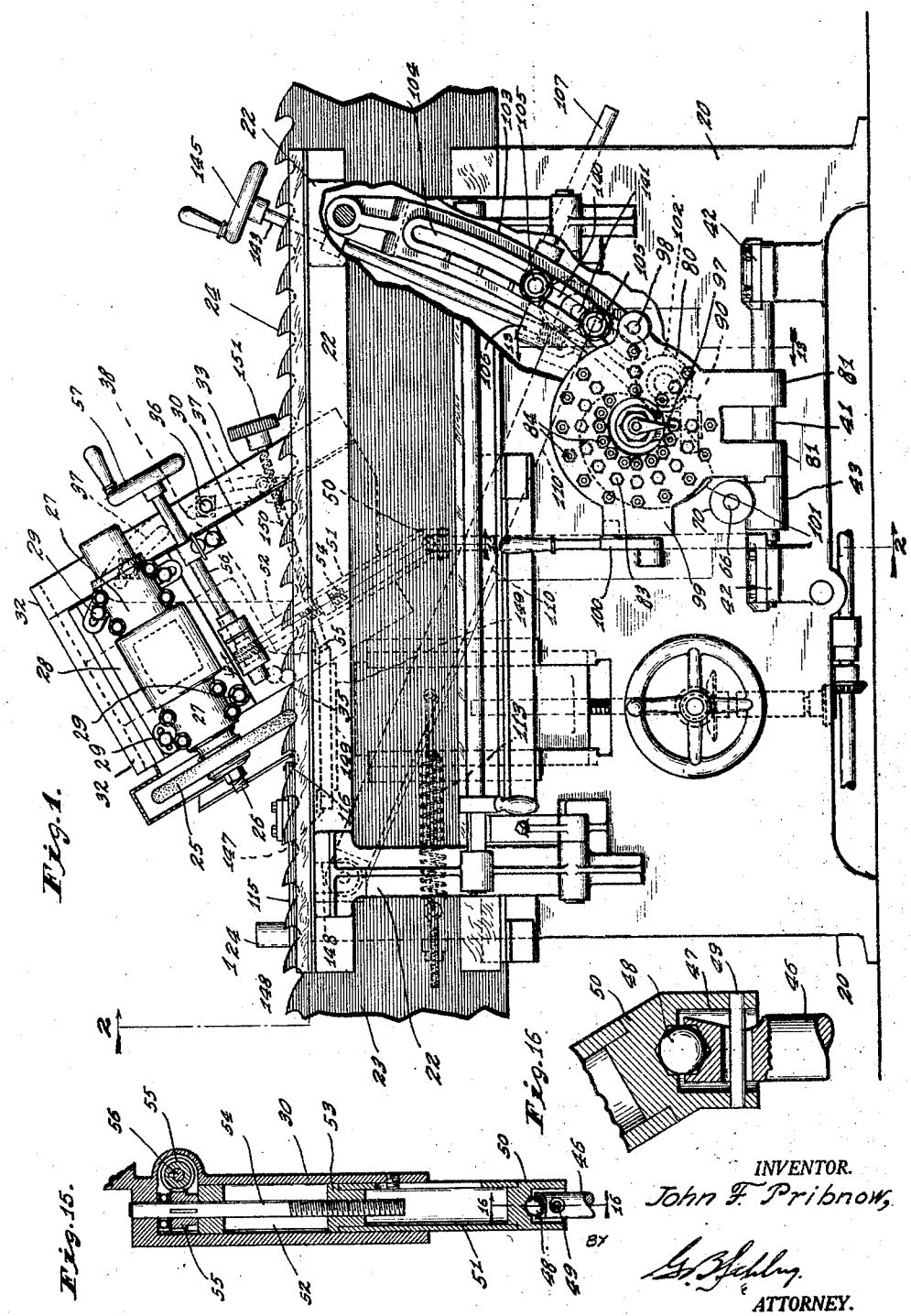
INVENTOR.
John F. Pribnow,
ATTORNEY.

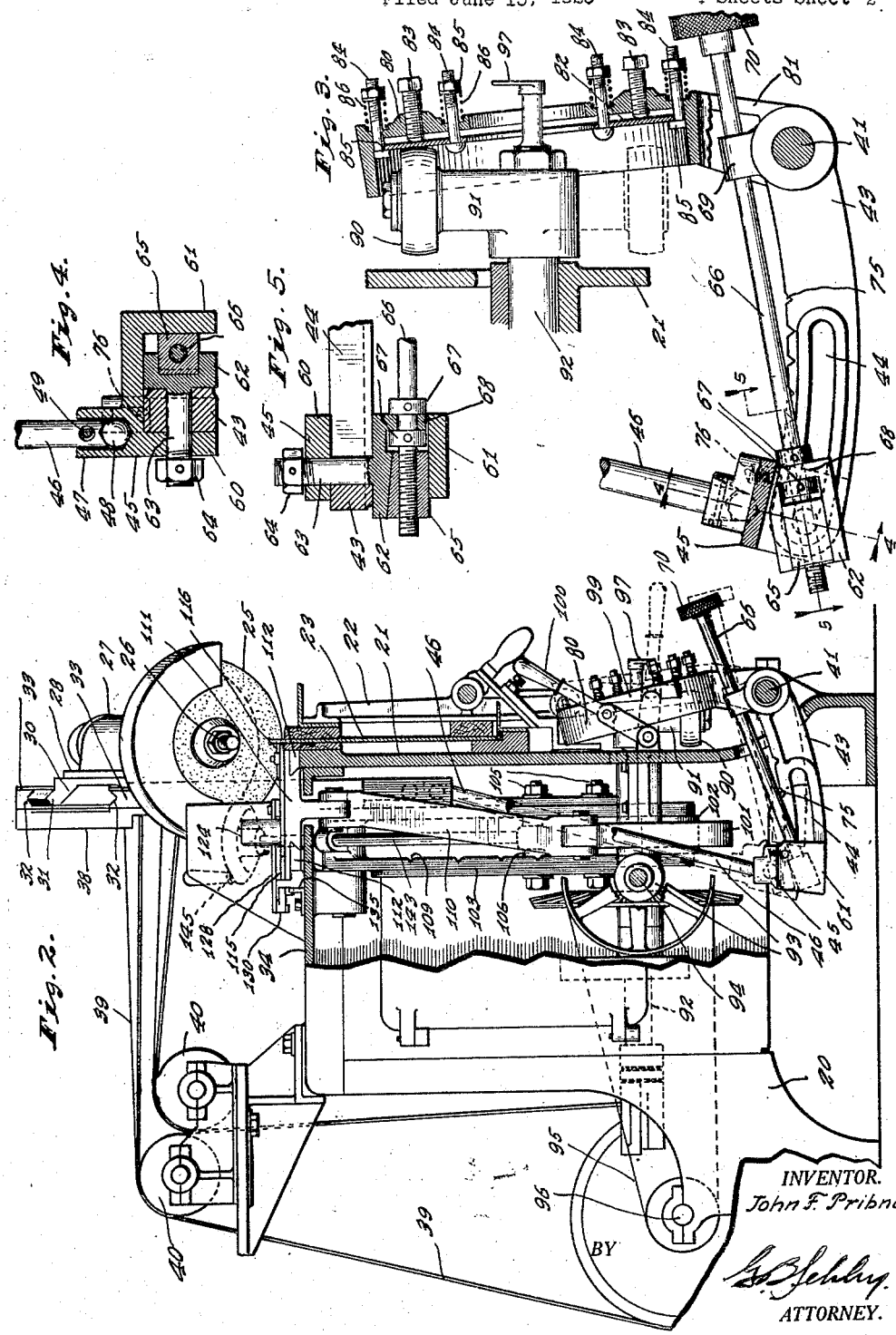

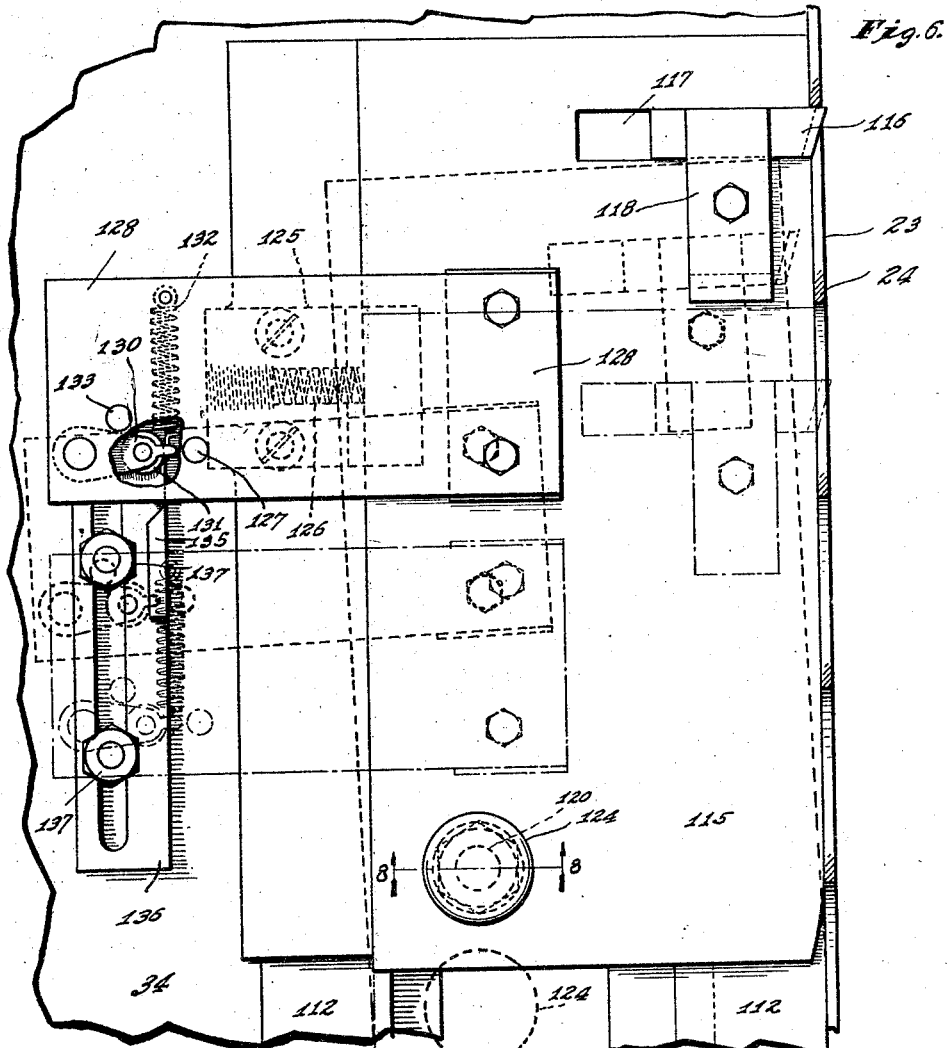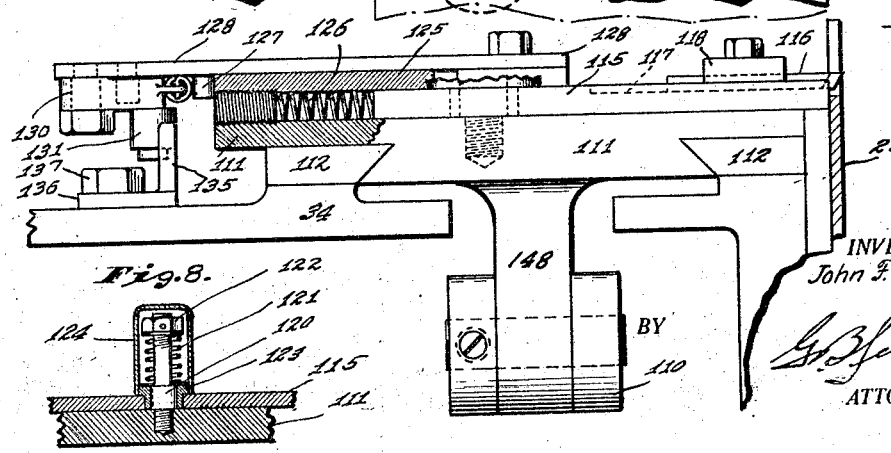

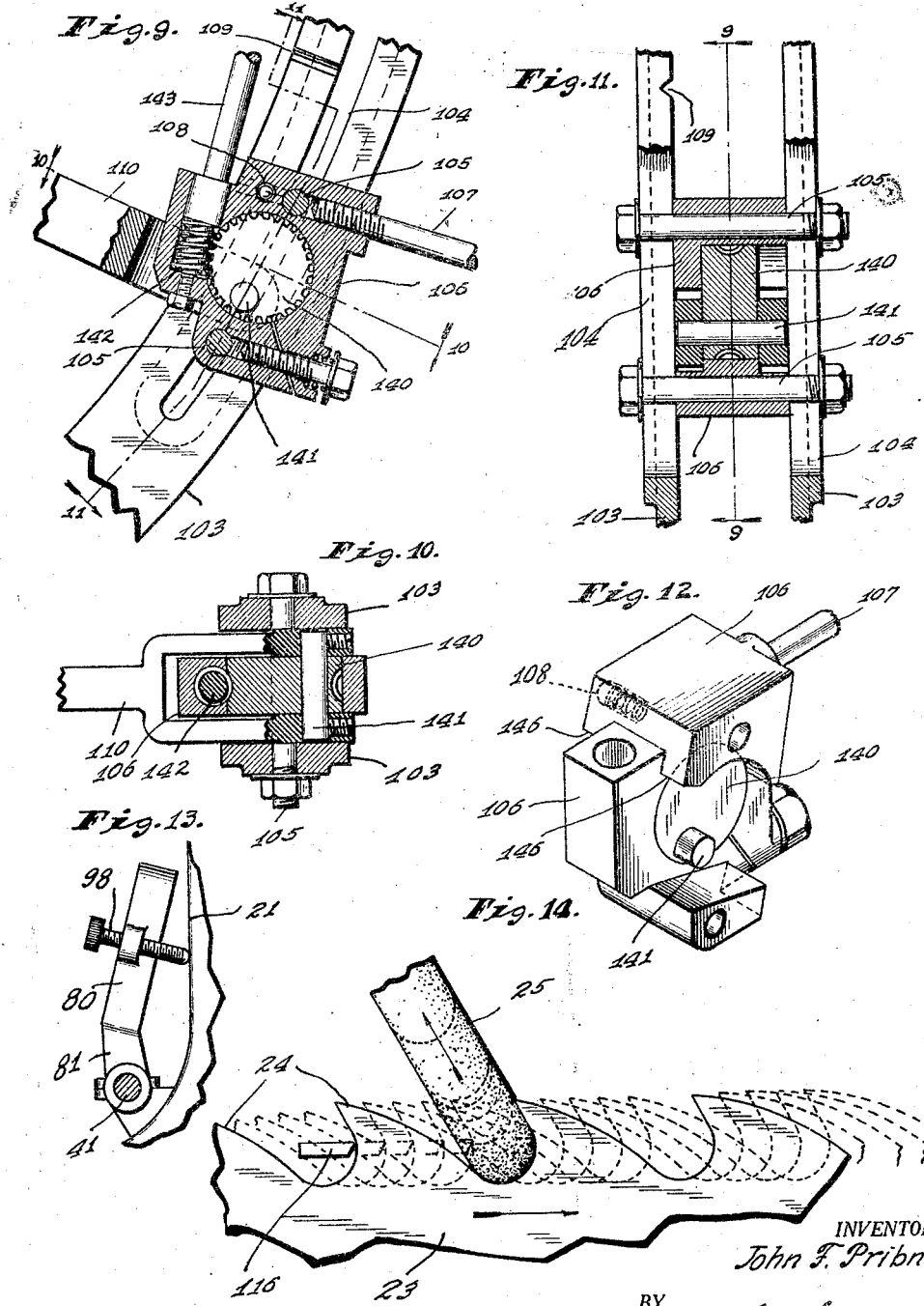

Patented Aug. 25, 1925.

1,551,054

UNITED STATES PATENT OFFICE.

JOHN F. PRIBNOW, OF INDIANAPOLIS, INDIANA, ASSIGNOR TO E. C. ATKINS & COMPANY, OF INDIANAPOLIS, INDIANA, A CORPORATION OF INDIANA.

SAW-GRINDING MACHINE.

Application filed June 15, 1923. Serial No. 645,678.

*To all whom it may concern:*

Be it known that I, JOHN F. PRIBNOW, a citizen of the United States, residing at Indianapolis, in the county of Marion and State of Indiana, have invented a new and useful Saw-Grinding Machine, of which the following is a specification.

It is the object of my invention to produce an automatic saw-grinder in which the non-grinding intervals between the grinding of successive teeth are materially lessened in length, so that the proportion of actual grinding time to the whole time of operation is materially increased; in which the travel of the grinding wheel over the teeth may be accurately and easily controlled, and a path-controlling cam may be used which approximates a plane and ordinarily needs but slight adjustment from the plane shape; in which all the necessary adjustments are easily made by devices readily accessible to the operator and in general capable of manipulation while the machine is in operation; and in which the adjustments for tooth-pitch and tooth-height are interrelated, so that they may be properly and easily set for standard dimensions of saws in co-ordination with each other.

In carrying out my invention, I provide a saw-feeding mechanism which travels around the sides of the saw teeth instead of over the points thereof, so that it is more quickly out of the way of the grinding wheel, and the grinding wheel can be in operation a much greater percentage of the operating time. I prefer that this saw-feeding device shall include a feeding dog which instead of dragging over the side face of the saw on its non-feeding stroke is moved out of engagement with the saw on such stroke. In addition, I provide a rocking face-cam which co-operates with a circularly traveling cam roller and has a face which is set obliquely with respect to both the axis about which such cam roller rotates and to the rocking axis of the face cam itself, so that as it rocks it produces a curved travel of the edge of the grinding wheel relative to the saw in the general shape of a saw tooth; in consequence of which the face of the cam ordinarily needs but a slight adjustment from a plane to make it conform to any of the standard saw-tooth shapes. I mount this face cam on the front of the machine, so that its adjusting screws are readily accessible to the operator. In addition, I provide special adjusting means for the thrust links of the saw-feeding mechanism and of the grinding-wheel elevator at their points of connections to the swinging arms which operate them; which special adjusting means include in both cases an adjusting rod which swings with the arm and has its setting means fairly close to the fulcrum thereof, so that it can easily be manipulated. These two adjusting devices have correlated position-notches, to co-ordinate the two adjustments. The adjusting means have individual features which also constitute part of my invention, as will later appear.

My present invention is a development of my prior Patent No. 1,179,556, granted April 18, 1916; but is directed fundamentally to the saw-grinding feature, which can be used either alone or in the combination with saw-swaging and saw-shaping devices shown in such prior patent.

The accompanying drawings illustrate my invention: Fig. 1 is a front elevation of a saw-grinding machine embodying my invention, with some parts broken away, and with only a fragment of the saw shown; Fig. 2 is an end elevation, from the left of Fig. 1, but partly in section on the line 2—2 of Fig. 1; Fig. 3 is a sectional detail of the face-cam and its directly associated parts, being a sectional view corresponding largely to what is shown in elevation in the lower right-hand corner of Fig. 2, and viewed in the same direction; Figs. 4 and 5 are detail fragmental sections on the lines 4—4 and 5—5, respectively, of Fig. 3; Fig. 6 is a plan, on a somewhat enlarged scale, of the saw-feeding mechanism; Fig. 7 is an end elevation of the saw-feeding mechanism of Fig. 6, in partial section; Fig. 8 is a reduced section on the line 8—8 of Fig. 6; Fig. 9 is a fragmental sectional detail of the adjusting connection for the upper end of the thrust rod of the saw-feeding mechanism, the section being on the line 9—9 of Fig. 11; Figs. 10 and 11 are fragmental sectional details on the lines 10—10 and 11—11, respectively, of Fig. 9; Fig. 12 is a perspective view of the adjustment block of Figs. 9, 10, and 11; Fig. 13 is a simplified section on the line 13—13 of Fig. 1, to show the stop means for limiting the in-swing of the face cam; Fig. 14 is a diagrammatic view showing different positions of the grinding wheel in relation to the saw tooth as the grinding wheel moves upward and the saw moves forward; Fig. 15 is a section on the line 15—15 of Fig. 1; and Fig. 16 is a fragmental section on the line 16—16 of Fig. 15.

The main frame 20 has a vertical front plane 21 between which and a releasable clamping plate 22 the saw 23 to be ground is slidingly received, so that the teeth 24 of the saw project upward in position to be ground. The details of the holding mechanism associated with the front plate 21 and clamping plate 22 for holding the saw 23 at proper height and in proper position while allowing it to be slid forward may be anything desired, and constitute no part of my invention.

The grinding wheel or disk 25 for grinding the saw teeth 24 is set obliquely, as shown in Fig. 1, and is slidable transversely to its carrying shaft 26 in the general plane of the saw 23, which is a substantially vertical plane. For this movement, the shaft 26 is mounted in bearings 27 on a bearing plate 28, which is attached by bolts 29 to a sliding plate 30. One of the bolts 29 is preferably a pivot bolt, and the others preferably pass through arc-shaped slots centering on such pivot bolt to permit tilting of the bearing plate 28 and grinding wheel 25 to different angles with respect to the direction of sliding of the sliding plate 30; for it is sometimes desired that the axis of the grinding wheel shall be at an oblique angle to such direction of sliding, instead of perpendicular thereto.

The sliding plate 30 has slide lugs 31 at the rear, which slide lugs fit slidingly in oppositely facing slide grooves 32 (Fig. 2) in a slide-way plate 33. This slide-way plate 33 extends through a slot in the table 34 formed by the top of the frame 20, and is normally stationary with the slide grooves 32 oblique to such table 34. This obliqueness is preferably adjustable; for which the slide-way plate 33 is mounted on a pivot stud 35 as close as possible to the point of the tooth being ground so that any tilting will be very closely around the point at which the grinding wheel 25 is working, and on clamping bolts 36 which pass through such plate 33 and through arc-shaped slots 37 in a supporting plate 38 projecting upward from the table 34. By loosening the bolts 36, the slide-way plate 33 may be tilted to adjust the angle of the sliding plate 30 with respect to the table 34. Thus both the angular position of the line in which the grinding wheel slides and the angle of the grinding-wheel plane to such line are adjustable.

The grinding wheel 25 is shown as belt-driven, which drive I now prefer. The driving belt 39 passes some distance rearward from both sides of a pulley on the shaft 26, in substantially parallel stretches, and around two idler pulleys 40 and thence to a drive pulley on a power shaft 96. The idler pulleys are located as close together as possible to minimize the variation in belt length as the grinding wheel reciprocates, or as it is adjusted in the ways already described.

The sliding plate 30 is slid along the slide-grooves 32 by the rocking of a rock-shaft 41, which carries a face-cam to be described in detail later. This rock-shaft 41 is mounted in bearings 42, and extends horizontally along the front face of the frame 20, near the bottom thereof. This rock-shaft 41 is provided with a rearwardly projecting arm 43, which projects through an opening in the front plate 21 and is provided with a longitudinal adjusting slot 44.

A thrust-block 45 is adjustably mounted on the arm 43, by special clamping means co-operating with the slot 44; which clamping means will shortly be described. A thrust-rod 46 has its lower end loosely seated in a socket 47 in the thrust-block 45, on a ball 48 so that it has a universal movement, being held in place by a very loose cross-pin 49 which is so loose that it does not interfere with such universal movement. The upper end of the thrust-rod 46 is connected to a second thrust-block 50, by a universal-joint mounting exactly similar to that in the thrust-block 45, with a loose socket 47 and loose cross-pin 49 and thrust-bearing ball 48, shown in detail in Fig. 16. The thrust-block 50 is at the lower end of a thrust-tube 51 which is telescopingly mounted in a tubular portion 52 provided on the sliding plate 30 substantially parallel to the direction in which such plate slides, as is clear from Figs. 1 and 15. A thrust-nut 53 seated in the top of the thrust-tube 51 receives the threaded lower end of an adjusting screw 54. The upper end of this adjusting screw 54 has a thrust-bearing mounted in the upper end of the tubular portion 52; and is geared, as by spiral gearing 55, to an adjusting shaft 56 mounted on the sliding plate 30 transverse to the direction of sliding thereof. The adjusting shaft 55 has a suitable hand wheel 57, by the turning of which the position of the tube 51 in the tubular portion 52 is adjusted to vary the vertical position (not the length) of the stroke of the sliding plate 30. The two universal joints at the balls 48 take care of the varying obliqueness, both that required by adjustment and that required in operation, between the line of movement of the plate 30 and the line of movement of the thrust-block 45. This obliqueness is made as great as the drawings indicate for the sake of compactness, for it is not essential that the rock-shaft 41 be horizontal, or at as great an angle to the perpendicular to the line of movement of the sliding plate 30 as the drawing shows.

The adjustment of the thrust-block 45 on the arm 43 varies the length of the stroke of the sliding plate 30, and is obtained from the front of the machine without reaching behind the front plate 21. The thrust-block 45 is in the form of a yoke, which rests upon and astride the arm 43, with two downwardly projecting flanges 60 and 61. A wedge-block 62 is interposed between the flange 41 and the arm 43, so that it is on the opposite side of the arm 43 from the flange 60. This wedge-block 62 has a stem 63 which extends through the slot 44, and through a hole in the flange 60, and may carry on its projecting end a nut 64 which is not a clamping nut but is merely to hold the members from coming apart. A wedge 65 is located between the wedge-block 62 and the flange 61, and may be seated in a groove in the face of one of such members, as for instance in the face of the wedge-block 62. This wedge 65 has a threaded hole through it, to receive the threaded end of an adjusting screw 66, which carries two collars 67 receiving between them a flange 68 of the wedge-block 62. The screw 66 extends in general along the arm 43, and loosely through a supporting lug 69 near the pivotal end of such arm, and is provided at the front of the machine with a knurled adjusting head 70. By turning this knurled adjusting head 70, which is easily accessible, the thrust-block 45 may be clamped in any desired position of adjustment, or released so that by pulling or pushing on the screw 66 the desired adjustment may be made. Such push or pull acts through the collars 67, flange 68, wedge-block 62, and stem 63 to move the thrust-block 45 along the slot 44; while turning the knurled head 70 moves the wedge 65 toward or from the flange 68 to clamp or release the wedge-block 62 and arm 43 between the two flanges 60 and 61.

The upper edge of the arm 43 is provided with a plurality of notches 75, to co-operate with a downwardly spring-pressed ball 76 carried by the thrust-block 45. This ball and the notches enable the operator to feel when certain standard positions of adjustment of the thrust-block 45 on the arm 43 are reached; which standard positions correspond to definite standard lengths of stroke of the sliding-plate 30 and grinding wheel 25, for standard heights of saw-teeth.

The rock-shaft 41, as already stated, carries the face-cam which accurately controls the movement of the sliding plate 30 to get an accurate travel of the grinding edge of the rotating grinding wheel 25 along the successive teeth 24 of the saw 23 as such saw is fed intermittently forward. This face-cam comprises a supporting plate 80, of general annular shape, carried by arms 81 on the rock-shaft 41; but the plate 80 is in a plane angularly offset from the arms 81, or is oblique to a radius through it from such rock-shaft. Behind the plate 80, which is a rigid plate, is a flexible cam-ring 82, of thin sheet-metal, which is adjustably carried by the plate 80. This adjustable mounting comprises an annular series of screws 83 which are mounted in the plate 80 and project therethrough into pushing engagement with the adjacent face of the flexible cam-ring 82; and two annular series of pull-bolts 84 located substantially concentric with and respectively inside of and outside of the ring of screws 83. The pull-bolts 84 project through both the plate 80 and the flexible cam-ring 82, and have heads on the inner face of the cam-ring and nuts 85 in front of the plate 80, with compression springs 86 between the nuts 85 and the plate 80. By adjusting the screws 83, with perhaps some minor adjustments of the nuts 85, for the springs 86 serve as take-up springs and for ordinary adjustments make it unnecessary to touch such nuts, the flexible cam-ring 82 may be varied in shape as desired. By thus pushing or pulling the various circumferential parts of the cam-ring relative to each other, it is easily possible to get any desired rate of travel of the grinding wheel 85 at different points in its reciprocation.

The series of screws 83 and pull-bolts 84 need not be equally spaced around the circle, and are preferably closer together for that part of the cam which produces the up-travel of the grinding wheel 25, as it travels over the back of the tooth 24 during the feeding movement of the saw 23, than they are for that part of the cam which produces the down-travel of such grinding wheel, as then the saw is at rest. However, for normal saw teeth, my present arrangement of parts makes it unnecessary for the cam-ring 82 to be distorted very far from a plane.

The flexible cam-ring 82 is engaged by a roller 90 mounted on a radial axis on an arm 91 on a main shaft 92, which is suitably mounted in the frame 20 near the bottom substantially perpendicularly to the plane of the saw 23. This shaft is driven in any suitable way, as by bevel gearing 93 connecting it with a shaft 94, in turn connected by a belt 95 and suitable pulleys to the power shaft 96 at the back of the frame 20. The main shaft 92 has a forward extension through the middle of the cam ring 82 and plate 80, to carry a pointer 97 for indicating the position of the roller 90.

The co-operation of this roller 90 with the cam-ring 82 rocks the plate 80 and arm 43, and through them reciprocates the sliding plate 30 and grinding wheel 25. To this end, the plate 80 and cam-ring 82 are set normally oblique to the shaft 92, as is clear from Fig. 3; so that to maintain contact between the cam-ring 82 and roller 90 as the latter travels around the axis of the shaft 92 it is necessary for the plate 82 to swing toward and from the plane of travel of the arm 91, as is clear from the full-line and dotted-line positions of the roller 90 in Fig. 3. As the roller 90 travels from its topmost position, shown in full lines in Fig. 3, to its bottom-most position, shown in dotted lines in such Fig. 3, the plate 80 is swung by the gravity effect on its associated parts toward the plane of travel of the arm 91, which lets the plate 30 and grinding wheel 25 descend; but as the roller 90 travels from its lowermost (or dotted-line) position to its topmost (or full-line) position, it swings the plate 80 against such gravity effect away from such plane of travel, which lifts the plate 30 and the grinding wheel 25.

An adjustable stop-screw 98 is provided on the plate 80 for engaging at the front plate 21, to limit the swing of the plate 80 toward such front plate 21 if that is desired, and thus to let the roller 90 travel free of the cam-ring 82 during the lower arc of its movement, which arc is adjustable in length by adjusting the stop-screw 98.

Further, the plate 80 preferably has a lateral extension 99, which co-operates with a pin on a throw-out lever 100 when such throw-out lever is moved downward, to disengage the cam-ring 82 wholly from the roller 90, with the grinding wheel 25 raised to its limit; so that then the rotation of the shaft 92 produces no reciprocation of the grinding wheel 25.

The saw 23 is intermittently fed forward, or toward the right in Figure 1, in synchronism with the rise and fall of the grinding wheel, remaining at rest as the grinding wheel descends, and traveling forward as the grinding wheel rises. This feeding of the saw is obtained from the same shaft 92 which carries the roller 90. For this saw-feeding action, the shaft 92 has a cam 101, the cam-edge of which co-operates with a roller 102 on the lower end of a swinging arm 103, provided with a longitudinal adjusting slot 104 to receive a pair of clamping bolts 105 of an adjustable thrust-block 106. This thrust-block 106 is shiftable along the slot 104 to any desired position, for that purpose being provided with a laterally projecting shifting handle 107 easily accessible at the end of the machine. The standard positions are set by "feeling", by a spring-pressed ball 108 carried by the thrust-block 106 and co-operating with a series of notches 109 on a face of the swinging arm 103. The notches 109 correspond to definite lever-arm locations of the thrust-block 106 of the swinging arm 103, to provide saw-feeding movements corresponding to standard tooth-pitches, in the same way that the notches 75 provide lifting movements of the grinding wheel corresponding to standard tooth heights; and the two sets of notches 75 and 109 are suitably co-ordinated to correspond with the standard relations of tooth-height to tooth-pitch.

The thrust-block 106 is connected by a thrust-link 110 to a horizontally sliding feed-plate 111 mounted on slide-bars 112 on the table 34 to slide horizontally along a line parallel to the plane of the saw 23 but back of such plane. The adjusting slot 104 is an arc-shaped slot, having a center substantially at the pivotal connection between the thrust-link 110 and the feed-plate 111, so that the adjustment of the thrust-block 106 on the swinging arm 105 will cause but little variation in the position of the feed-plate 111 at the end of the its feeding movement. The feed-plate 111 is spring-pressed in the backward or non-feeding direction by a suitable tension spring 113, acting between the link 110 and the frame 20; and is moved against such spring in the forward or feeding direction, by the cam 101.

The feed-plate 111 supports a feed-finger plate 115 on its upper surface. This feed-finger plate 115 carries a feed-finger 116 which co-operates with the teeth 24 of the saw 23 to feed the saw forward as desired. The feed-finger 116 projects laterally of the saw plane into the notches between saw-teeth, as is clear from Figs. 6 and 7, and is tapered both backward and downward from its front feeding corner. This feed-finger 116 is adjustable transversely of the feed-finger plate 115 in a slot 117; and is held in adjusted position by a clamp-bar 118.

The feed-finger 116 moves laterally out of the plane of the saw 23, and preferably clears such saw, on the backward or non-feeding stroke. To this end, the feed-finger plate 115 is mounted on the feed-plate 111 on a pivot-bolt 120, at the corner opposite the feed-finger 116, and is resiliently held down in contact with such feed-plate by a compression spring 121 surrounding the upper end of the pivot-bolt 120 and acting between a nut 122 thereon and a bushing 123 in the feed-finger plate 115. The parts 120, 121, 122, and 123 may be enclosed in a covering thimble 124, if desired. The feed-finger plate 115 is further guided by a guide-plate 125 which overlaps its rear edge and is carried by the feed-plate 111. A compression spring 126 located between the feed-plate 111 and the guide-plate 125 tends to move the feed-finger plate 115 forward or toward the plane of the saw 23. Such movement is limited by a limit-pin 127, which projects downward from a pawl-plate 128 suitably fastened to the feed-finger plate 115 and overlying and projecting beyond the guide-plate 125 and co-operates with the rear edge of the guide-plate 125.

The pawl-plate 128 carries on its rearwardly projecting free end a pawl 130 having a roller 131. A spring 132 tends to pull the pawl 130 into engagement with a stop-pin 133 operating to hold the pawl 130 normally substantially perpendicular to the line of movement of the feed-finger plate 115. The roller 131 co-operates with a cam-finger 135 projecting upward from a cam-plate 136 adjustably mounted by a bolt and slot connection 137 on the upper face of the table 34. The forward end of the cam finger 135, which is engaged by the roller 131 as the feed-plate 111 and the parts carried thereby start on their backward or non-feeding movement, is oblique, to form a cam surface with which the roller 131 co-operates to swing the feed-finger plate 115 about the pivot-bolt 120 to swing the feed-finger 116 positively out of the plane of the saw 23; until the roller 131 has passed beyond the cam-finger 135 to let the feed-finger 116 swing back into the saw-plane to co-operate with the next tooth of the saw. Fig. 6 shows the feed-finger 116 in its successive positions in this movement, in full lines, dotted lines, and chain lines, respectively. By this positive movement, the feed-finger 116 not only moves laterally out of the plane of the saw, so that it passes around the side of a tooth instead of over the top thereof, but does so without dragging on the side face of the saw tooth. When the feed-plate 111 moves forward, on its feeding movement, the roller 131 engages the rear end-face of the cam-finger 135; but this merely causes the pawl 130 to swing away from the stop-pin 133 (without laterally shifting the feed-finger plate 115), until the cam-finger 135 has been passed: whereupon the spring 132 snaps the pawl 130 back to the position shown.

By reason of having this lateral movement of the feed-finger 116, the grinding wheel 25 may promptly start downward to grind the front face of the tooth which has been fed into position, without waiting for a feed-finger to move out of the way by climbing over the next tooth while still remaining in the plane of the saw. This lateral movement of the feed-finger 116, in place of a movement which keeps the feed-finger continuously in the saw plane, makes it possible to increase the length of the grinding interval from about one-third to two-thirds of the total operating time, and to reduce the non-grinding intervals from about two-thirds to one-third of the total time; in other words, it makes it possible substantially to double the relative lengths of the grinding intervals.

The position to which the feed-finger 116 moves a saw tooth about to be ground must be accurately adjusted. To get this accurate adjustment, I provide a special and easily accessible adjusting device between the thrust-block 106 and the thrust-link 110; which adjusting device the operator may adjust while standing in front of the tooth being ground while the machine is in operation, so that he may see exactly the effects of his adjustment under working conditions. To obtain this adjustment, the thrust-link 110 is not pivoted directly to the thrust-block 106. Instead, a worm-wheel 140 is mounted in the thrust-block 106, and is provided with an eccentric pin 141 to which a yoke at the adjacent end of the thrust-link is pivoted. The worm-wheel 140 has its teeth merely at the axial middle thereof, and is untoothed at the axial end portions of its periphery, as is clear from Figs. 10 and 11; so that such axial end portions serve as supporting or bearing portions in the receiving hole in the thrust-block 106. For clearness, however, these teeth are shown in Fig. 9, without cross-hatching the worm-wheel 140 in such figure. The worm teeth of the worm-wheel 140 co-operate with a worm 142 on the lower end of the worm-shaft 143; which lower end has a bearing in the thrust-block 106. The worm-shaft 143 extends substantially parallel to the arm 103, through a loose bearing in a supporting lug 144 at the upper or pivotal end of such arm, and is provided at its upper end with an adjusting wheel 145 which is close to the pivot of the arm 143 and rocks but slightly in the movement of such arm. In consequence, the operator may adjust the wheel 145 accurately, during operation, without interference from a too violent swinging; and may do so while standing directly in front of the saw tooth being operated on. By turning the adjusting wheel 145, the eccentric pin 141 is shifted transversely of the arm 103, within the limits set by the engagement of the upper edges of the adjacent fork of the thrust-link 110 with stop shoulders 146 provided on the thrust-block 106 (see Fig. 12). This movement of the pin 141 has so little component lengthwise of the arm 103 that it does not materially affect the length of the stroke of the feed-finger 116; but the lateral component of such movement adjusts the location of the stroke of the feed-finger 116, and determines the position of such feed-finger exactly for a given position of the arm 103.

To make even more sure that the feeding of the saw 23 forward shall stop with a saw tooth 24 accurately in position to be ground, I prefer to provide an adjustable stop-finger 147 in position to be struck at the end of a feeding stroke of the feed-plate 111 by the lug 148 by which the thrust-link 110 is connected to such feed-pipe. This stop-finger 147 is slidable in a supporting lug 149 on the frame 20, and may be slid to different positions therein by an adjusting screw 150 bearing against it and projecting obliquely upward through the table 34 to a point convenient to the operator, and there having a knurled head 151.

Thus by simple adjusting means readily accessible and correlated, the length and the location of the stroke of both the grinding wheel and the feed-finger are adjustable. The hand wheel 57 adjusts the location of the stroke of the grinding wheel 25; and the adjusting head 70 adjusts the length of such stroke of the grinding wheel. The hand wheel 145 adjusts the location of the stroke of the feed finger, and especially the point at which such stroke stops; and the shifting handle 107 adjusts the length of such stroke of the feed finger. The lengths of the strokes of the grinding wheel 25 and the feed finger 116 are co-ordinated for normal adjustments, by the two series of notches 75 and 109, for standard tooth-heights and standard tooth-pitches. The grinding wheel may be made to follow accurately the shape of the back of the tooth, as the saw 23 is fed forward by the co-operation of the cam 101 and roller 102 during the up-stroke of the grinding wheel 25, by adjusting the screws 83 and nuts 85; but by having the plate 80 set obliquely with respect to a radius from the rocker shaft 41 I have found that it is possible, even with a simple spiral shape for the cam 101, to make the grinding wheel 25 follow closely the curved back of the saw tooth 24 of any standard shape without greatly distorting the cam ring 82 from a plane. The full-line and the several dotted-line positions of the saw and grinding wheel in Fig. 14 clearly indicate the relation of one to the other as the saw is being fed forward.

I claim as my invention:—

1. An automatic saw grinder, comprising a rotatable grinding wheel, means for reciprocating said grinding wheel in the plane of the saw to be ground, and a feeding device for feeding said saw intermittently forward, said feeding device including a feed-finger which in its movement from one tooth to another of a saw swings laterally with respect to the plane of the saw to travel around the side of the saw tooth.

2. An automatic saw grinder, comprising a rotatable grinding wheel, means for reciprocating said grinding wheel, and a feeding device for feeding said saw intermittently forward, said feeding device including a feed-finger which in its movement from one tooth to another of a saw swings laterally with respect to the plane of the saw to travel around the side of the saw tooth.

3. An automatic saw grinder, comprising a rotatable grinding wheel, means for reciprocating said grinding wheel in a definite line, and a feeding device for feeding said saw intermittently forward, said feeding device including a feed-finger which in its movement from one tooth to another of a saw swings transversely to the line of reciprocation of the grinding wheel.

4. The combination set forth in claim 2, with the addition that said feeding means includes means for positively swinging the feed-finger laterally out of the plane of the saw so that it clears the saw teeth as it moves from one saw tooth to another on its backward or non-feeding stroke.

5. An automatic saw grinder, comprising a rotatable grinding wheel, means for reciprocating said grinding wheel, and a feeding device for feeding said saw intermittently forward, said feeding device and said reciprocating means including correlated adjusting devices for adjusting the length of the stroke of said feeding means and the length of reciprocation of said grinding wheel.

6. The combination set forth in claim 5, with the addition that the adjusting means for each of said adjustable motions includes a thrust-block movable along a swinging arm, and "feeling" means which indicate when the thrust-block is at definite positions along the arm.

7. An automatic saw grinder, comprising a rotatable grinding wheel, means for reciprocating said grinding wheel, means for intermittently feeding said saw forward to bring different saw teeth into co-operation with the grinding wheel, and four adjusting devices for separately adjusting the length and the location of the strokes of said reciprocating means and said feeding means respectively, said four adjusting devices all being accessible to an operator standing in front of the saw grinder.

8. An automatic saw grinder, comprising a rotating grinding wheel, means for reciprocating said grinding wheel, means for feeding the saw intermittently forward in synchronism with such reciprocation of such grinding wheel, and a common operating shaft carrying parts of both said reciprocating means and said feeding means, one of the parts carried by said shaft being a roller mounted on an arm, and the part which co-operates with it being a rocking face-cam co-operating with said roller to produce rocking of said face-cam as the shaft rotates.

9. The combination set forth in claim 8, with the addition that said rocking face cam includes a supporting plate, a flexible cam-ring which is engaged by said roller, and adjustable carrying means mounted in said rocking plate for supporting and varying the shape of said cam-ring.

10. The combination set forth in claim 8, with the addition that said rocking face-cam includes a supporting plate, a flexible cam-ring which is engaged by said roller, and adjustable carrying means mounted in said rocking plate for supporting and varying the shape of said cam-ring, and that said plate is on the front of the grinder and that said adjustable carrying means is accessible on the front of said rocking plate.

11. An automatic saw grinder, comprising a rotating grinding wheel, means for reciprocating said grinding wheel, means for feeding the saw intermittently forward in synchronism with such reciprocation of such grinding wheel, one of said reciprocating means and said feeding means including a rotating shaft, a roller carried by said shaft on an axis transverse to the shaft, and a rocking face-cam co-operating with said roller to be rocked thereby upon the rotation of said shaft.

12. An automatic saw grinder, comprising a rotating grinding wheel, means for reciprocating said grinding wheel, means for feeding the saw intermittently forward in synchronism with such reciprocation of such grinding wheel, one of said reciprocating means and said feeding means including a rotating shaft, a camming member carried by said shaft to act axially of the shaft in a path around the shaft as the shaft rotates, and a rocking plate co-operating with said camming member to be rocked thereby upon the rotation of said shaft.

13. The combination set forth in claim 12, with the addition that said rocking plate carries a flexible adjustable cam-ring which is directly engaged by said camming member.

14. The combination set forth in claim 12, with the addition that said rocking plate carries a flexible adjustable cam-ring which is directly engaged by said camming member, and also carries a plurality of adjusting devices for adjustably supporting said cam-ring and varying its shape.

15. The combination set forth in claim 12, with the addition that said rocking plate carries a flexible adjustable cam-ring which is directly engaged by said camming member, and also carries a plurality of adjusting devices for adjustably supporting said cam-ring and varying its shape, and that said rocking plate is at the front of the grinder and that said adjusting means are on the front of said plate.

16. The combination set forth in claim 12, with the addition that said rocking plate is mounted on an axis transverse to said shaft but is itself in a plane oblique to said rocking axis.

17. A camming device, comprising a supporting plate, a flexible cam-ring, an annular series of spring-pressed members acting between said plate and said cam-ring at various points around the latter and tending to pull the cam-ring toward the plate at such points, and an annular series of push-screws acting between said plate and said cam-ring at various points around the latter to push the cam-ring adjustably away from the plate at such points against the action of said spring-pressed members.

18. The combination set forth in claim 17, with the addition that said plate is rockingly mounted, and a shaft carrying a roller which travels around said cam-ring and co-operates therewith to rock said plate.

19. A camming mechanism, comprising a supporting plate, a flexible cam-ring, an annular series of push-screws mounted in said plate and acting on said cam-ring at different points around it, and two annular series of tension rods respectively within and without the annular series of push-screws and acting on said cam-ring, said tension rods being provided with springs which act through the tension rods to tend to draw the cam-ring toward the plate at various points around said cam-ring.

20. The combination set forth in claim 19, with the addition of a shaft carrying a roller which travels around said cam-ring as the shaft rotates, said shaft and said plate being mounted so that the reaction between said roller and said cam-ring shifts one of them along the axis of the shaft relative to the other.

21. An automatic saw grinder, comprising a rotating grinding wheel, a slide-plate carrying said grinding wheel and slidable relatively to the line of saw teeth, means for varying the angle between the direction of sliding of said slide-plate and the line of saw teeth, a rocker arm, a thrust-block mounted on said arm, and a thrust-rod acting between said thrust-block and said slide-plate, said thrust-block being arranged to move in a path out of line with the line of movement of said slide-plate, and said thrust-rod having universal-joint thrust-taking connections with said thrust-block and said sliding-plate.

22. An automatic saw grinder, comprising a rotating grinding wheel, a slide-plate carrying said grinding wheel and slidable relatively to the line of saw teeth, a rocker arm, a thrust-block mounted on said arm, and a thrust-rod acting between said thrust-block and said slide-plate, said thrust-block being arranged to move in a path out of line with the line of movement of said slide-plate, and said thrust-rod having universal-joint thrust-taking connections with said thrust-block and said sliding-plate.

23. An automatic saw grinder, comprising a rotatable grinding wheel, a slide-plate carrying said grinding wheel and slidable relatively to the line of saw teeth, a rocker arm, a thrust-block mounted on said rocker arm, operating connections between said thrust-block and said sliding-plate, said thrust-block including a pair of flanges set astride said rocker arm, a wedge-block and a wedge co-operatively mounted between said arm and one of said flanges to produce clamping of said arm between the two flanges, and a rod connected with said thrust-block for sliding it along said rocker arm, said rod being provided with screw-means acting between said wedge-block and wedge to produce wedging and unwedging.

24. A leverage-adjusting mechanism, comprising a rocker arm, a wedge-block set on said rocker arm, one of said parts having flanges between which the other is located, a wedge-block and a wedge co-operatively set between one of said flanges and the part on which the flanged member is astride, and a rod provided with screw-means acting between said wedge and said wedge-block to produce wedging and unwedging, said wedge-block being attached to said thrust-block so that by pulling or pushing said rod the thrust-block may be slid to different positions along said rocker arm.

25. A feeding mechanism, comprising a rocker arm, a thrust-block mounted thereon, a link pivotally associated with said thrust-block, a feeding device connected to said link, and means for shifting laterally of said rocker arm the point of pivot connection between said thrust block and said link.

26. The combination set forth in claim 25, with the addition that said pivot connection comprises a wheel mounted in said thrust-block and having an eccentric pin to which said link is pivoted, and means for turning said wheel.

27. The combination set forth in claim 25, with the addition that said thrust-block is adjustable along said rocker arm.

28. The combination set forth in claim 25, with the addition that said thrust-block is adjustable along said rocker arm, and that said pivot connection comprises a wheel mounted in said thrust-block and having an eccentric pin to which said link is pivoted, and means for turning said wheel.

29. A saw-feeding mechanism, comprising a rocker arm, a thrust-block mounted thereon, a reciprocable saw-feeding finger, and a link pivotally connected to said thrust-block and directly connecting said thrust-block and said reciprocable saw-feeding finger, the pivotal connection point between said thrust-block and said link being adjustable transversely of said rocker arm.

30. The combination set forth in claim 29, with the addition that the pivotal connection point between said thrust block and said link is adjustable longitudinally as well as transversely of said rocker arm.

31. A saw-feeding mechanism, comprising a reciprocable saw-feeding finger arranged to engage teeth of the saw to feed the saw intermittently forward, and means for reciprocating said saw-feeding finger, said saw-feeding finger being mounted so that in its movement from one tooth to another of a saw it swings laterally with respect to the plane of the saw to travel around the side of the saw tooth.

In witness whereof, I have hereunto set my hand at Indianapolis, Indiana, this 14th day of June, A. D. one thousand nine hundred and twenty three.

JOHN F. PRIBNOW.